(12) United States Patent
Katayama

(10) Patent No.: US 11,807,765 B2
(45) Date of Patent: Nov. 7, 2023

(54) INK SET AND INKJET TEXTILE PRINTING METHOD

(71) Applicant: KYOCERA Document Solutions Inc., Osaka (JP)

(72) Inventor: Yosuke Katayama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 190 days.

(21) Appl. No.: 17/376,620

(22) Filed: Jul. 15, 2021

(65) Prior Publication Data
US 2022/0017765 A1  Jan. 20, 2022

(30) Foreign Application Priority Data
Jul. 20, 2020 (JP) .................................. 2020-123725

(51) Int. Cl.
| | | |
|---|---|---|
| C09D 11/40 | (2014.01) | |
| C09D 11/322 | (2014.01) | |
| C09D 11/38 | (2014.01) | |
| C09D 11/037 | (2014.01) | |
| C09D 11/107 | (2014.01) | |
| C09D 11/102 | (2014.01) | |
| B41M 5/00 | (2006.01) | |
| D06P 5/30 | (2006.01) | |
| D06P 5/00 | (2006.01) | |
| D06P 1/52 | (2006.01) | |
| B41J 3/407 | (2006.01) | |
| C09D 11/54 | (2014.01) | |

(52) U.S. Cl.
CPC ............. *C09D 11/40* (2013.01); *B41J 3/4078* (2013.01); *B41M 5/0017* (2013.01); *C09D 11/037* (2013.01); *C09D 11/102* (2013.01); *C09D 11/107* (2013.01); *C09D 11/322* (2013.01); *C09D 11/38* (2013.01); *C09D 11/54* (2013.01); *D06P 1/525* (2013.01); *D06P 1/5285* (2013.01); *D06P 5/002* (2013.01); *D06P 5/30* (2013.01)

(58) Field of Classification Search
CPC .... B41J 11/002; B41J 11/0015; B41J 3/4078; B41J 2/2114; D06P 5/30; B41M 7/0081; B41M 5/0047; B41M 5/0011; C09D 11/101; C09D 11/322; C09D 11/54; C09D 11/037; C09D 11/30; C09D 7/68; C09D 7/67
See application file for complete search history.

(56) References Cited

U.S. PATENT DOCUMENTS

| | | | | |
|---|---|---|---|---|
| 5,320,781 A | * | 6/1994 | Stahlecker | C08K 7/00 106/419 |
| 6,499,839 B1 | * | 12/2002 | Busby | B41J 2/175 347/100 |
| 7,427,323 B1 | * | 9/2008 | Birau | C09B 67/0017 106/31.77 |
| 7,503,973 B1 | * | 3/2009 | Carlini | C09B 67/0065 106/31.77 |
| 7,927,412 B2 | | 4/2011 | Kuriyama et al. | |
| 2009/0025603 A1 | | 1/2009 | Kuriyama et al. | |
| 2011/0151244 A1 | * | 6/2011 | Wu | C09D 7/61 106/287.19 |
| 2017/0233595 A1 | * | 8/2017 | Erdodi | D06P 1/5278 428/201 |
| 2019/0249022 A1 | * | 8/2019 | Ingle | C09D 11/322 |
| 2019/0367760 A1 | * | 12/2019 | Loccufier | B41M 5/0047 |
| 2019/0375223 A1 | * | 12/2019 | Rahimi | B41J 11/00216 |
| 2020/0369903 A1 | * | 11/2020 | Van Aert | C08K 3/013 |
| 2021/0070082 A1 | * | 3/2021 | Guo | B41M 5/0011 |
| 2021/0139733 A1 | * | 5/2021 | Loccufier | C09D 11/322 |
| 2021/0403740 A1 | * | 12/2021 | Loccufier | C09D 11/10 |

FOREIGN PATENT DOCUMENTS

| | | |
|---|---|---|
| JP | 2009-029888 A | 2/2009 |
| JP | 2017-141387 A | 8/2017 |

\* cited by examiner

*Primary Examiner* — John Zimmermann
(74) *Attorney, Agent, or Firm* — Studebaker & Brackett PC

(57) ABSTRACT

An ink set includes an inkjet ink and a pretreatment liquid. The inkjet ink contains pigment particles, an anionic dispersant, and binder resin particles. The pigment particles have a major axis of at least 50 nm and no greater than 200 nm. The pigment particles have an aspect ratio of at least 2.0 and no greater than 3.0. The binder resin particles contain a specific binder resin. The specific binder resin has a glass transition point of at least 0° C. and no higher than 45° C. The pretreatment liquid contains water and a cationic material.

7 Claims, No Drawings

INK SET AND INKJET TEXTILE PRINTING METHOD

INCORPORATION BY REFERENCE

The present application claims priority under 35 U.S.C. § 119 to Japanese Patent Application No. 2020-123725, filed on Jul. 20, 2020. The contents of this application are incorporated herein by reference in their entirety.

BACKGROUND

The present disclosure relates to an ink set and an inkjet textile printing method.

An example of an inkjet ink used in an inkjet textile printing method contains pigment particles and a dispersant. An inkjet ink which uses pigment particles must have excellent ejection stability and be capable of forming an image with a desired image density and excellent scratch resistance.

An inkjet ink containing pigment particles with an aspect ratio of at least 1.0 and no greater than 2.0 has been proposed as an example of an inkjet ink with excellent ejection stability. Furthermore, an inkjet ink containing pigment particles with an aspect ratio of at least 5.0 and no greater than 7.0 has been proposed as an example of an inkjet ink capable of forming an image with a desired image density.

SUMMARY

An ink set according to an aspect of the present disclosure includes an inkjet ink and a pretreatment liquid. The inkjet ink contains pigment particles, an anionic dispersant, and binder resin particles. The pigment particles have a major axis of at least 50 nm and no greater than 200 nm. The pigment particles have an aspect ratio of at least 2.0 and no greater than 3.0. The binder resin particles contain a specific binder resin. The specific binder resin has a glass transition point of at least 0° C. and no higher than 45° C. The pretreatment liquid contains water and a cationic material.

An inkjet textile printing method according to an aspect of the present disclosure is a method by which an image is formed on an image formation area of a textile printing target using the above-described ink set. The inkjet textile printing method includes performing pretreatment by applying the pretreatment liquid to the image formation area and ejecting the inkjet ink from a head onto the image formation area.

DETAILED DESCRIPTION

The following describes embodiments of the present disclosure. Note that a "major axis" of pigment particles refers to an average value of the major axes of 100 pigment particles measured using an electron microscope. A "minor axis" of pigment particles refers to an average value of the minor axes of 100 pigment particles measured using an electron microscope. An "aspect ratio" of pigment particles refers to the ratio (major axis/minor axis) of the major axis of the pigment particles (average value of the major axes of 100 pigment particles) to the minor axis of the pigment particles (average value of the minor axes of 100 pigment particles).

A glass transition point (Tg) refers to a value measured in accordance with "Japanese Industrial Standard (JIS) K7121-2012" using a differential scanning calorimeter (e.g., "DSC-6220", product of Seiko Instruments Inc.) unless otherwise stated. The glass transition point corresponds to the temperature (onset temperature) of the inflection point caused by glass transition (intersection point of an extrapolated falling line and an extrapolated baseline) on a heat absorption curve (vertical axis: heat flow (DSC signal), horizontal axis: temperature) measured by the differential scanning calorimeter.

In the present specification, the term "(meth)acryl" may be used as a generic term for both acryl and methacryl. One type of each component described in the present specification may be used independently, or two or more types of the component may be used in combination.

First Embodiment: Ink Set

The following describes an ink set according to a first embodiment of the present disclosure. The ink set of the present disclosure is an ink set which includes an inkjet ink (may be referred to in the following simply as an ink) and a pretreatment liquid. The ink contains pigment particles, an anionic dispersant, and binder resin particles. The pigment particles have a major axis of at least 50 nm and no greater than 200 nm. The pigment particles have an aspect ratio of at least 2.0 and no greater than 3.0. The binder resin particles contain a specific binder resin. The specific binder resin has a glass transition point of at least 0° C. and no higher than 45° C. The pretreatment liquid contains water and a cationic material.

A preferable example of the ink set of the present disclosure is the ink set used in a later-described inkjet textile printing method.

By having the above-described features, the ink set of the present disclosure has excellent ink ejection stability and is capable of forming an image with a desired image density and excellent scratch resistance. The reasons for this are surmised to be as follows. In general, pigment particles tend to be anionic. Because the ink included in the ink set of the present disclosure contains both pigment particles that tend to be anionic and an anionic dispersant, the pigment particles are relatively strongly anionic. By contrast, the pretreatment liquid included in the ink set of the present disclosure contains a cationic material. The cationic material makes a textile printing target cationic to promote adsorption of the pigment particles to the textile printing target. Furthermore, the cationic material prevents electrostatic repulsion between the pigment particles to agglomerate the pigment particles on the textile printing target. In addition, the pigment particles contained in the ink included in the ink set of the present disclosure readily stick to the surface of the textile printing target without permeating the textile printing target due to having a relatively large aspect ratio of at least 2.0. Through the above, the ink set of the present disclosure can form an image with a desired image density.

In general, an ink containing pigment particles with an excessively large aspect ratio (e.g., pigment particles with an aspect ratio larger than 3.0) tends to readily increase in viscosity when the density of the pigment particles is increased by drying. However, the pigment particles contained in the ink included in the ink set of the present disclosure have an aspect ratio of no greater than 3.0, meaning that the aspect ratio is not excessively large. As such, the ink included in the ink set of the present disclosure does not readily increase in viscosity even when the ink dries while attached to the nozzle part of an inkjet textile printing apparatus and the pigment particles increase in density. Through the above, the ink set of the present disclosure has excellent ink ejection stability.

Furthermore, the ink included in the ink set of the present disclosure contains binder resin particles. The binder resin particles have excellent film formability due to containing a specific binder resin with a relatively low glass transition point (a glass transition point of no higher than 45° C.). The ink set of the present disclosure can form an image with excellent scratch resistance because the binder resin particles contained in the ink display excellent film formability and protect the pigment particles attached to the textile printing target. If the glass transition point of the specific binder resin contained in the binder resin particles were to be excessively low (e.g., the glass transition point is lower than 0° C.), the binder resin particles would soften in normal temperature and the binder resin particles would easily clog an ink nozzle. By contrast, the specific binder resin contained in the binder resin particles in the ink set of the present disclosure has a glass transition point of at least 0° C., which means that the glass transition point is not excessively low. As such, the binder resin particles contained in the ink of the ink set of the present disclosure do not readily clog an ink nozzle. From the above, the ink set of the present disclosure can maintain excellent ink ejection stability.

[Ink]

The ink contains the pigment particles, the anionic dispersant, and the binder resin particles. Preferably, the ink further contains at least one of water, water-soluble organic solvent, and nonionic surfactant.

(Pigment Particles)

The pigment particles contain a pigment. The pigment particles are dispersed in a solvent, for example. The pigment particles have the major axis of at least 50 nm and no greater than 200 nm, preferably at least 100 nm and no greater than 200 nm, and more preferably at least 150 nm and no greater than 180 nm. By setting the major axis of the pigment particles to at least 50 nm, an image with a desired image density can be formed. By setting the major axis of the pigment particles to no greater than 200 nm, ink ejection stability can be improved.

The pigment particles have the aspect ratio of at least 2.0 and no greater than 3.0, preferably at least 2.3 and no greater than 2.9. By setting the aspect ratio of the pigment particles to at least 2.0, an image with a desired image density can be formed. By setting the aspect ratio of the pigment particles to no greater than 3.0, ink ejection stability can be improved.

Examples of the pigment include yellow pigments, orange pigments, red pigments, blue pigments, violet pigments, and black pigments. Examples of the yellow pigments include C.I. Pigment Yellow (74, 93, 95, 109, 110, 120, 128, 138, 139, 151, 154, 155, 173, 180, 185, or 193). Examples of the orange pigments include C.I. Pigment Orange (34, 36, 43, 61, 63, or 71). Examples of the red pigments include C.I. Pigment Red (122 or 202). Examples of the blue pigments include C.I. Pigment Blue (15, more specifically 15:3). Examples of the violet pigments include C.I. Pigment Violet (19, 23, or 33). Examples of the black pigments include C.I. Pigment Black (7).

The content ratio of the pigment particles in the ink is preferably at least 1.0% by mass and no greater than 15.0% by mass, and more preferably at least 5.0% by mass and no greater than 10.0% by mass. By setting the content ratio of the pigment particles to at least 1.0% by mass, an image with a desired image density can be formed. By setting the content ratio of the pigment particles to no greater than 15.0% by mass, ink fluidity can be improved.

(Anionic Dispersant)

Examples of the anionic dispersant include anionic surfactants, polymers with an acid group, and salts of polymers with an acid group. Examples of the acid groups include carboxyl groups and sulfo groups.

Examples of the anionic surfactants include fatty acid soap (e.g., sodium stearate and sodium dodecanoate) and sulfonate salt compounds (e.g., sodium dodecyl sulfate and sodium dodecylbenzenesulfonate).

Examples of the polymers with an acid group include polycarboxylic acid and copolymers with a repeating unit derived from (meth)acrylic acid. Examples of the polycarboxylic acid include poly(meth)acrylic acid, polymaleic acid, polyphthalic acid, and a copolymer of (meth)acrylic acid and maleic acid. Examples of the copolymers with a repeating unit derived from (meth)acrylic acid include copolymers with a repeating unit derived from (meth)acrylic acid and a repeating unit derived from a vinyl compound other than (meth)acrylic acid. Examples of the vinyl compound other than (meth)acrylic acid include styrene and alkyl ester (meth)acrylate.

Examples of the salt of a polymer with an acid group include an alkylol ammonium salt of a polymer with an acid group and a metal salt (e.g., sodium salt) of a polymer with an acid group. Examples of the alkylol ammonium salt of a polymer with an acid group include "DISPERBYK (registered Japanese trademark) 180", "DISPERBYK (registered Japanese trademark) 181", and "DISPERBYK (registered Japanese trademark) 187", products of BYK Chemie Japan, K. K.

The anionic dispersant is preferably an alkylol ammonium salt of a polymer with an acid group.

The content ratio of the anionic dispersant in the ink is preferably at least 0.1% by mass and no greater than 3.0% by mass, and more preferably at least 0.3% by mass and no greater than 1.0% by mass. By setting the content ratio of the anionic dispersant to at least 0.1% by mass, the dispersibility of the pigment particles in the ink can be improved. By setting the content ratio of the anionic dispersant to no greater than 3.0% by mass, ink ejection stability can be improved.

(Binder Resin Particles)

The binder resin particles contain the specific binder resin. The specific binder resin has the glass transition point of at least 0° C. and no higher than 45° C., and preferably at least 30° C. and no higher than 45° C. By setting the glass transition point of the specific binder resin to at least 0° C., ink ejection stability can be improved. By setting the glass transition point of the specific binder resin to no higher than 45° C., the scratch resistance of an image formed using the ink set of the present disclosure can be improved.

Examples of the specific binder resin include (meth)acrylic resin, styrene resin, polyvinyl resin, polyester resin, amino resin, epoxy resin, urethane resin, polyether resin, polyamide resin, phenolic resin, silicone resin, fluororesin, and a copolymer including monomers of any of these resins (e.g., styrene-(meth)acrylic resin or urethane-(meth)acrylic resin). The specific binder resin is preferably (meth)acrylic resin, styrene-(meth)acrylic resin, urethane resin, urethane-(meth)acrylic resin, or polyester resin.

The binder resin particles preferably contain only the specific binder resin, but may further contain a binder resin other than the specific binder resin. The content ratio of the specific binder resin in the binder resin particles is preferably at least 90% by mass, and more preferably at least 99% by mass.

The content ratio of the binder resin particles in the ink is preferably at least 0.5% by mass and no greater than 8.0% by mass, and more preferably at least 1.0% by mass and no greater than 4.0% by mass. By setting the content ratio of the binder resin particles to at least 0.5% by mass, the scratch resistance of an image formed using the ink set of the present disclosure can be further improved. By setting the content ratio of the binder resin particles to no greater than 8.0% by mass, ink ejection stability can be further improved.

(Water)

When the ink contains water, the content ratio of the water in the ink is preferably at least 30.0% by mass and no greater than 70.0% by mass, and more preferably at least 40.0% by mass and no greater than 60.0% by mass.

(Water-Soluble Organic Solvent)

Examples of the water-soluble organic solvent include glycol compounds, polyhydric alcohol ether compounds, lactam compounds, nitrogen-containing compounds, acetate compounds, thiodiglycol, glycerin, and dimethyl sulfoxide.

Examples of the glycol compounds include ethylene glycol, 1,3-propanediol, 1,2-propanediol, diethylene glycol, triethylene glycol, tetraethylene glycol, and 3-methyl-1,5-pentanediol.

Examples of the polyhydric alcohol ether compounds include diethylene glycol diethyl ether, diethylene glycol monobutyl ether, ethylene glycol monomethyl ether, ethylene glycol monobutyl ether, diethylene glycol monomethyl ether, diethylene glycol monoethyl ether, diethylene glycol diethyl ether, triethylene glycol monomethyl ether, triethylene glycol monoethyl ether, and propylene glycol monomethyl ether.

Examples of the lactam compounds include 2-pyrrolidone and N-methyl-2-pyrrolidone.

Examples of the nitrogen-containing compounds include 1,3-dimethylimidazolidinone, formamide, and dimethyl formamide.

Examples of the acetate compounds include diethylene glycol monoethyl ether acetate.

The water-soluble organic solvent is preferably a glycol compound, a lactam compound, or glycerin, and more preferably 1,2-propanediol, 1,3-propanediol, triethylene glycol, 3-methyl-1,5-pentanediol, 2-pyrrolidone, or glycerin.

When the ink contains a water-soluble organic solvent, the content ratio of the water-soluble organic solvent in the ink is preferably at least 20.0% by mass and no greater than 60.0% by mass, and more preferably at least 30.0% by mass and no greater than 50.0% by mass.

When the ink contains a glycol compound, the content ratio of the glycol compound in the ink is preferably at least 10.0% by mass and no greater than 45.0% by mass, and more preferably at least 25.0% by mass and no greater than 35.0% by mass.

When the ink contains a lactam compound, the content ratio of the lactam compound in the ink is preferably at least 0.5% by mass and no greater than 10.0% by mass, more preferably at least 1.5% by mass and no greater than 5.0% by mass.

When the ink contains glycerin, the content ratio of the glycerin in the ink is preferably at least 1.0% by mass and no greater than 15.0% by mass, and more preferably at least 3.0% by mass and no greater than 8.0% by mass.

(Nonionic Surfactant)

The nonionic surfactant improves the compatibility and dispersion stability of the components contained in the ink. The nonionic surfactant also improves the permeability (wettability) of the ink in a textile printing target.

Examples of the nonionic surfactant include polyoxyethylene dodecyl ether, polyoxyethylene hexadecyl ether, polyoxyethylene nonylphenyl ether, polyoxyethylene sorbitan monooleate ether, sucrose monodecanoate, and ethylene oxide adducts of acetylene glycol. The nonionic surfactant is preferably an ethylene oxide adduct of acetylene glycol.

When the ink contains a nonionic surfactant, the content ratio of the nonionic surfactant in the ink is preferably at least 0.1% by mass and no greater than 5.0% by mass, and more preferably at least 0.5% by mass and no greater than 2.0% by mass.

(Other Components)

The ink may further contain any known additives (e.g., a solution stabilizer, an anti-drying agent, an antioxidant, a viscosity modifier, a pH adjuster, or an antifungal agent) as necessary.

Examples of the anti-drying agent include sugar alcohols. Examples of the sugar alcohols include sorbitol, maltitol, xylitol, erythritol, lactitol, mannitol, threitol, arabitol, ribitol, isitol, volemitol, perseitol, and galactitol.

When the ink contains an anti-drying agent, the content ratio of the anti-drying agent in the ink is preferably at least 1.0% by mass and no greater than 15.0% by mass, and more preferably at least 3.0% by mass and no greater than 8.0% by mass.

[Ink Preparation Method]

The ink can be prepared by for example uniformly mixing the pigment dispersion, the binder resin particles, and any other components added as necessary (e.g., water, a water-soluble organic solvent, a nonionic surfactant, or an anti-drying agent) using a stirrer. In the preparation of the ink, foreign objects and coarse particles may be removed through filtration or centrifugation after the uniform mixing of the components.

(Pigment Dispersion)

The pigment dispersion is a dispersion containing pigment particles and an anionic dispersant. The dispersion medium of the pigment dispersion is preferably water.

The content ratio of the pigment particles in the pigment dispersion is at least 5.0% by mass and no greater than 25.0% by mass, for example. The content ratio of the anionic dispersant in the pigment dispersion is at least 5.0% by mass and no greater than 15.0% by mass, for example.

The pigment dispersion can be prepared by wet dispersing the pigment particles, the anionic dispersant, the dispersion medium (e.g., water), and any other components added as necessary using a media type wet disperser. In the wet dispersion using a media type wet disperser, small-diameter beads (e.g., beads with a D50 of at least 0.5 mm and no greater than 1.5 mm) can be used for example as a medium. The material of the beads is not particularly limited, but is preferably a hard material (e.g., glass or zirconia).

When the pigment dispersion is used in the production of the ink, the proportion of the pigment dispersion to all materials of the ink is at least 30.0% by mass and no greater than 70.0% by mass, for example.

(Pigment Particle Preparation Method)

The pigment particles with the major axis and the aspect ratio described above can be obtained by salt milling, for example. A specific example of the salt milling is described in the following. First, a mixture is obtained by mixing a pigment to be used as a material (may be referred to in the following as pigment material), a salt (e.g., sodium chloride), a solvent, and additional materials added as necessary (e.g., a dispersion agent). Next, the mixture is kneaded using a kneader (e.g., a double arm kneader). After the salt and the solvent have been removed by rinsing the kneaded mixture, the resultant mixture is dried. Through the above, the pigment particles can be obtained. In the salt milling, the major axis and the aspect ratio of the pigment particles can be adjusted by changing the kneading conditions and the amount of salt used.

The kneading conditions are for example a temperature of at least 50° C. and no higher than 100° C., a rotation speed of at least 1000 rpm and no higher than 4000 rpm, and a processing time of at least 1 hour and no longer than 10 hours.

Examples of the salt used for the salt milling include sodium chloride, calcium chloride, and potassium chloride. The salt is preferably sodium chloride. In the salt milling, the major axis and the aspect ratio of the obtained pigment particles tends to decrease as the amount of salt used increases. The amount of salt is preferably at least 300 parts by mass and no greater than 600 parts by mass relative to 100 parts by mass of the pigment material, and more preferably at least 350 parts by mass and no greater than 450 parts by mass. By setting the amount of salt used to at least 300 parts by mass and no greater than 600 parts by mass, pigment particles with the major axis and the aspect ratio described above can be easily obtained.

A water-soluble organic solvent, for example, can be used as the solvent used in the salt milling. Examples of the water-soluble organic solvent used in the salt milling include the same compounds listed as the example of the water-soluble organic solvent used in the ink. The water-soluble organic solvent used in the salt milling is preferably a glycol compound, and more preferably diethylene glycol. The amount of the solvent used is preferably at least 100 parts by mass and no greater than 400 parts by mass relative to 100 parts by mass of the pigment material, and more preferably at least 150 parts by mass and no greater than 250 parts by mass.

A dispersion agent improves the dispersibility of the pigment particles. Examples of the dispersion agent include pigment derivatives (compounds in which a polar functional group is introduced to a pigment). When a pigment derivative is used in the salt milling, the amount of the pigment derivative used is preferably at least 3.0 parts by mass and no greater than 15.0 parts by mass relative to 100 parts by mass of the pigment.

[Pretreatment Liquid]

The pretreatment liquid contains water and a cationic material. The pretreatment liquid may contain a component other than water and the cationic material (e.g., a binder resin or a water-soluble organic solvent), but preferably contains only water and the cationic material. In the pretreatment liquid, the total content ratio of water and the cationic material is preferably at least 90% by mass, and more preferably 100% by mass.

Examples of the cationic material include metal salts, cationic polymers, and cationic surfactants. The cationic material is preferably a metal salt.

Examples of a cation in a metal salt include monovalent metal ions and polyvalent metal ions. Examples of the monovalent metal ions include a sodium ion and a potassium ion. Examples of the polyvalent ions include a calcium ion, a magnesium ion, a copper ion, a nickel ion, a zinc ion, a barium ion, an aluminum ion, a titanium ion, a strontium ion, a chromium ion, a cobalt ion, and an iron ion. The cation in a metal salt is preferably a calcium ion.

Examples of an anion in a metal salt include a chlorine ion, a bromine ion, an iodine ion, a nitrate ion, a sulfate ion, an acetate ion, a carbonate ion, and a hydroxide ion. The anion in a metal salt is preferably a chlorine ion.

Examples of the metal salts include calcium chloride, calcium nitrate, calcium sulfate, calcium acetate, calcium hydroxide, calcium carbonate, magnesium chloride, magnesium acetate, magnesium sulfate, magnesium carbonate, barium sulfate, barium chloride, zinc sulfide, zinc carbonate, and copper nitrate. The metal salt is preferably calcium chloride.

Examples of a cationic resin include (meth)acrylic resin with an amino group and (meth)acrylic resin with a functional group derived from a quaternary ammonium salt. The cationic resin is preferably (meth)acrylic resin with an amino group, and more preferably polyallylamine.

The content ratio of the cationic material in the pretreatment liquid is preferably at least 1.0% by mass and no greater than 10.0% by mass, and more preferably at least 3.0% by mass and no greater than 7.0% by mass. Furthermore, the content ratio of the cationic material in the pretreatment liquid in terms of solid content is preferably at least 80.0% by mass and no greater than 100.0% by mass, and more preferably at least 95.0% by mass and no greater than 100.0% by mass.

(Water)

The content ratio of the water in the pretreatment liquid is preferably at least 50.0% by mass and no greater than 90.0% by mass, and more preferably at least 60.0% by mass and no greater than 80.0% by mass.

[Pretreatment Liquid Preparation Method]

The pretreatment liquid can be prepared by for example mixing water and the cationic material. Note that mineral water with a high degree of hardness may be used directly as the pretreatment liquid.

Second Embodiment: Inkjet Textile Printing Method

Next, an inkjet textile printing method according to a second embodiment of the present disclosure is described. The inkjet textile printing method of the present disclosure forms an image in an image formation area of a textile printing target using the ink set according to the first embodiment. The inkjet textile printing method of the present disclosure includes a pretreatment process of performing pretreatment by applying the pretreatment liquid to the image formation area and an ink ejection process of ejecting the ink from a head onto the image formation area. Because the inkjet textile printing method of the present disclosure uses the ink set according to the first embodiment, the ink has excellent ejection stability and an image with a desired image density and excellent scratch resistance can be formed.

The material of the textile printing target used in the inkjet textile printing method of the present disclosure is not particularly limited, but examples thereof include cotton, silk, hemp, acetate resin, rayon, nylon resin, polyurethane resin, and polyester resin. The material of the textile printing target is preferably cotton.

[Pretreatment Process]

In the present process, the pretreatment liquid is applied to the image formation area of the textile printing target. The method by which the pretreatment liquid is applied to the image formation area is not particularly limited, but examples thereof include a method by which the pretreatment liquid is ejected from a head, a method by which the pretreatment liquid is scattered by spraying, and a method by which the textile printing target is immersed in a vat filled with the pretreatment liquid. Note that in the present process, the textile printing target is preferably dried after the pretreatment liquid has been applied to the image formation area of the textile printing target.

[Ink Ejection Process]

In the present process, the ink is ejected from a head onto the image formation area of the textile printing target to form a desired image. The head is not particularly limited, but examples thereof include a piezoelectric head and a thermal inkjet head.

In the present process, the amount of ink ejected is preferably at least 1.0 g/m² and no greater than 10.0 g/m².

EXAMPLES

The following describes Examples of the present disclosure. However, the present disclosure is not limited to the following Examples.

kneaded product, the kneaded product was dehydrated using a filter press ("Manual Filter Press SQ", product of Kurita Machinery Mfg. Co., Ltd.). The dehydrated kneaded substance was dried for 24 hours in a vacuum dryer ("ETTAS AVO-250V", product of AS ONE CORPORATION) and coarsely pulverized to obtain pigment particles (p-1).

(Preparation of Pigment Particles (p-2) to (p-11))

Pigment particles (p-2) to (p-11) were prepared by the same method as that for preparation of the pigment particles (p-1) in all aspects other than the changes described below. In the preparation of the pigment particles (p-2) to (p-11), the types and the amounts of the materials were changed as described below in Table 1. Note that "-" in Table 1 indicates that the corresponding material was not used.

TABLE 1

| | | Pigment particles | | | | | | | | | | |
|---|---|---|---|---|---|---|---|---|---|---|---|---|
| | | p-1 | p-2 | p-3 | p-4 | p-5 | p-6 | p-7 | p-8 | p-9 | p-10 | p-11 |
| Pigment material [parts by mass] | C | 250 | 250 | 250 | 250 | 250 | 250 | 250 | 250 | — | — | — |
| | M | — | — | — | — | — | — | — | — | 250 | — | — |
| | Y | — | — | — | — | — | — | — | — | — | 250 | — |
| | K | — | — | — | — | — | — | — | — | — | — | 250 |
| Dispersion agent [parts by mass] | A-1 | 20 | 20 | 30 | 20 | 10 | 10 | 40 | 10 | — | — | 20 |
| | A-2 | — | — | — | — | — | — | — | — | 20 | 20 | — |
| NaCl [parts by mass] | | 1200 | 1000 | 1700 | 700 | 2000 | 2200 | 1000 | 1200 | 1000 | 1000 | 1000 |
| DEG [parts by mass] | | 500 | 500 | 500 | 500 | 500 | 500 | 500 | 500 | 500 | 500 | 500 |

[Preparation of Pigment Particles]

Pigment particles (p-1) to (p-11) were prepared by the following methods. First, pigment materials and dispersion agents used to prepare the pigment particles are described.

(Pigment Material)

Pigment material (C): "HELIOGEN (registered Japanese trademark) BLUE D7088", product of BASF Japan Ltd., cyan pigment Pigment material (M): "MAGENTA D4550", product of BASF Japan Ltd., magenta pigment Pigment material (Y): "PALCOHOL YELLOW D1115J", product of BASF Japan Ltd., yellow pigment Pigment material (K): "MONARCH (registered Japanese trademark) 800", product of Cabot Japan K. K., black pigment (carbon black)

(Dispersion Agent)

Dispersion agent (A-1): "BYK-SYNERGIST 2100", product of BYK Japan KK, pigment derivative Dispersion agent (A-2): "BYK-SYNERGIST 2105", product of BYK Japan KK, pigment derivative (Preparation of Pigment Particles (p-1))

First, 250 parts by mass of the above-described pigment material (C), 20 parts by mass of the dispersion agent (A-1), 1200 parts by mass of sodium chloride (NaCl) as a salt, and 500 parts by mass of diethylene glycol (DEG) as a solvent were mixed. The obtained mixture was charged (volume ratio of mixture to capacity of kneader: approximately 50% by mass) into a double-armed kneader ("S5-2", product of Moriyama Co., Ltd.) and kneaded (salt milled) for 5 hours at a temperature of 80° C., under normal humidity, and at a rotation speed of 2000 rpm. After rinsing the obtained

[Preparation of Pigment Dispersion]

Pigment dispersions (P-1) to (P-14) were prepared by the following methods. First, the dispersants used to prepare the pigment dispersions are described.

(Dispersant)

Dispersant (D-1): anionic dispersant ("DISPERBYK (registered Japanese trademark) 180", product of BYK Japan KK), alkylol ammonium salt of a polymer with an acid group, non-volatile component 81% by mass Dispersant (D-2): anionic dispersant ("FLOWLEN GW-1640", product of Kyoeisha Chemical Co., Ltd.), polymer modified product with a carboxyl group, active component 40% by mass Dispersant (D-3): anionic dispersant ("FLOWLEN G-700DMEA", product of Kyoeisha Chemical Co., Ltd.), dimethyl ethanolamine salt of polymer modified product with a carboxyl group, active component 70% by mass Dispersant (D-4): cationic dispersant ("DISPERBYK (registered Japanese trademark) 161", product of BYK Japan KK), high molecular weight block copolymer with a pigment affinity group, non-volatile component 30% by mass (Preparation of Pigment Dispersion (P-1))

After adding 760 parts by mass of ion exchange water to 90 parts by mass of the anionic dispersant (D-1) described above, 150 parts by mass of the pigment particles (p-1) were further added. The obtained mixture was premixed by stirring at 5000 rpm for 1 hour using a high-speed disper (T. K. ROBOMIX+T. K. HOMODISPER Model 2.5, product of PRIMIX Corporation). Next, the premixed mixture underwent dispersion processing using a bead mill ("MSC50", product of Nippon Coke & Engineering Co., Ltd.). In the dispersion processing, zirconia beads (0.2 mm diameter) were used as a medium. Furthermore, in the dispersion processing, the filling ratio of the medium in a vessel of the bead mill was set to 80% by volume. Through the above, the pigment dispersion (P-1) was obtained.

(Preparation of Pigment Dispersions (P-2) to (P-14))

The pigment dispersions (P-2) to (P-14) were prepared by the same method as that for preparation of the pigment dispersion (P-1) in all aspects other than the changes described below. In the preparation of the pigment dispersions (P-2) to (P-14), the types of the pigment particles and the dispersant used were changed as shown below in Tables 2 and 3.

TABLE 2

| | Pigment dispersion | | | | | | | |
|---|---|---|---|---|---|---|---|---|
| | P-1 | P-2 | P-3 | P-4 | P-5 | P-6 | P-7 | P-8 |
| Pigment particles | p-1 | p-2 | p-3 | p-4 | p-5 | p-6 | p-7 | p-8 |
| Dispersant | D-1 | D-1 | D-1 | D-1 | D-1 | D-1 | D-1 | D-1 |

TABLE 3

| | Pigment dispersion | | | | | |
|---|---|---|---|---|---|---|
| | P-9 | P-10 | P-11 | P-12 | P-13 | P-14 |
| Pigment particles | p-9 | p-10 | p-11 | p-2 | p-2 | p-2 |
| Dispersant | D-1 | D-1 | D-1 | D-2 | D-3 | D-4 |

(Binder Resin Particles)

Binder resin particles (A) to (G) as shown below were prepared. The binder resin particles (A), (B), and (E) to (G) each contained a specific binder resin.

Binder resin particles (A): "MOWINYL (registered Japanese trademark) 6520", product of Japan Coating Resin Corporation, acrylic resin particles (41° C. glass transition point)

Binder resin particles (B): "MOWINYL (registered Japanese trademark) 880", product of Japan Coating Resin Corporation, styrene-acrylic resin particles (3° C. glass transition point)

Binder resin particles (C): "MOWINYL (registered Japanese trademark) 7525", product of Japan Coating Resin Corporation, acrylic resin particles (−16° C. glass transition point)

Binder resin particles (D): "MOWINYL (registered Japanese trademark) 7180", product of Japan Coating Resin Corporation, acrylic resin particles (53° C. glass transition point)

Binder resin particles (E): "SUPERFLEX (registered Japanese trademark) 150HS", product of DKS Co. Ltd., urethane resin particles (32° C. glass transition point)

Binder resin particles (F): "WEM-200U", product of Taisei Fine Chemical Co., Ltd., urethane-acrylic resin particles (27° C. glass transition point)

Binder resin particles (G): "PLAS COAT (registered Japanese trademark) Z-880", product of GOO Chemical Co., Ltd., polyester resin particles (20° C. glass transition point)

[Preparation of Ink]

(Preparation of Ink (I-1))

After mixing 50 parts by mass of the pigment dispersion (P-1), 2 parts by mass of the binder resin particles (A), 10 parts by mass of ion exchange water, 5 parts by mass of glycerin, 14 parts by mass of 1,3-propanediol, 15 parts by mass of triethylene glycol, 3 parts by mass of 2-pyrrolidone, and 1 part by mass of a nonionic surfactant ("SURFYNOL (registered Japanese trademark) 420", product of Nissin Chemical Industry Co., Ltd. (acetylene glycol surfactant)), the resultant mixture was stirred (preparation method a). Through the above, an ink (I-1) was obtained.

(Preparation of Inks (I-2) to (I-12) and (I-14) to (I-21))

Inks (I-2) to (I-12) and (I-14) to (I-21) were prepared by the same method as that for preparation of the ink (I-1) in all aspects other than the changes in types of the pigment dispersion and the binder resin particles to those shown below in Tables 4 to 6.

(Preparation of Ink (I-13))

After mixing 50 parts by mass of the pigment dispersion (P-2), 2 parts by mass of the binder resin particles (A), 11 parts by mass of ion exchange water, 3 parts by mass of sorbitol, 20 parts by mass of 3-methyl-1,5-pentanediol, 10 parts by mass of propylene glycol, 3 parts by mass of 2-pyrrolidone, and 1 part by mass of a nonionic surfactant ("SURFYNOL (registered Japanese trademark) 420", product of Nissin Chemical Industry Co., Ltd. (acetylene glycol surfactant)), the resultant mixture was stirred (preparation method b). Through the above, an ink (I-13) was prepared.

(Preparation of Ink (I-22))

After mixing 50 parts by mass of the pigment dispersion (P-2), 10 parts by mass of ion exchange water, 5 parts by mass of glycerin, 15 parts by mass of 1,3-propanediol, 16 parts by mass of triethylene glycol, 3 parts by mass of 2-pyrrolidone, and 1 part by mass of a nonionic surfactant ("SURFYNOL (registered Japanese trademark) 420", product of Nissin Chemical Industry Co., Ltd (acetylene glycol surfactant)), the resultant mixture was stirred (preparation method c). Through the above, an ink (I-22) was prepared.

[Measurement of Major Axis and Aspect Ratio of Pigment Particles]

The major axis and the aspect ratio of the pigment particles were determined by the following method. The measurement results are as shown below in Tables 4 to 6. First, a mesh substrate ("4110S-CF", product of ALLIANCE Biosystems, Inc.) was immersed in a vat filled with a measurement target (specifically, one of the inks (I-1) to (I-22)). Next, the mesh substrate with the measurement target adsorbed thereto was frozen using liquid nitrogen. Next, the pigment particles attached to the mesh substrate were observed using a transmission electron microscope ("JEM2200FS", product of JEOL Ltd.). The average value of the major axes of 100 pigment particles was calculated, and the obtained average value was taken to be the major axis of the pigment particles. The average value of the minor axes of the 100 pigment particles was calculated, and the obtained average value was taken to be the minor axis of the pigment particles. The ratio (major axis/minor axis) of the major axis of the pigment particles (average value of the major axes of 100 pigment particles) to the minor axis of the pigment particles (average value of the minor axes of 100 pigment particles) was taken to be the aspect ratio of the pigment particles.

In the measurement of the major axis of a pigment particle, two imaginary parallel lines were set to have a maximum interval therebetween capable of sandwiching the pigment particle to be used as a measurement target. This interval was taken to be the measurement value of the major axis. In the measurement of the minor axis of the pigment particle, a third imaginary parallel line was set to be equidistant from the two imaginary parallel lines described above. A width of the particle measured at the intersection of the third imaginary parallel line and the particle was taken to be the measurement value of the minor axis.

[Preparation of Pretreatment Liquid]

(Pretreatment Liquid (T-1))

A 5% by mass calcium chloride solution was prepared and used as a pretreatment liquid (T-1).

(Pretreatment Liquid (T-2))

A polyallylamine solution ("PAA (registered Japanese trademark) –01", product of Nittobo Medical Co., Ltd.) and ion exchange water were mixed to prepare a 5% by mass polyallylamine solution. The prepared solution was taken to be a pretreatment liquid (T-2).

(Pretreatment Liquid (T-3))

A specialty cationic activator ("NICCA SUNSOLT AN", product of NICCA CHEMICAL CO., LTD.) and ion exchange water were mixed to prepare 5% by mass of a specialty cationic activator solution. The prepared solution was taken to be the pretreatment liquid (T-3).

<Ink Set>

One of the inks (I-1) to (I-22) was combined with one of the pretreatment liquids (T-1) to (T-3) as shown below in Tables 4 to 6. Through the above, ink sets used in the inkjet textile printing of Examples 1 to 15 and Comparative Examples 2 to 10 were prepared. In the inkjet textile printing of Comparative Example 1, the ink (I-2) was used independently instead of an ink set.

<Evaluation>

With respect to each of the ink sets and the ink, inkjet textile printing was performed using the ink set or the ink using the following method. Ink ejection stability and the image density and scratch resistance of a formed image were evaluated. The evaluation results are shown below in Tables 4 to 6. Cotton broadcloth (product of SHIKISENSHA CO., LTD.) was used as the textile printing target. Note that the evaluation was performed in an environment of a 23° C. temperature and 50% relative humidity (normal temperature and normal humidity environment).

[Evaluation Apparatus]

A prototype produced by KYOCERA Document Solutions Inc. was used as an evaluation apparatus. The evaluation apparatus included a recording head ("KJ4B-YH", product of KYOCERA Inc.) with a plurality of nozzles. The recording head had a nozzle-cleaning function for purging ink from the nozzles. The evaluation apparatus had a function of wiping ink attached to the nozzles of the recording head. The evaluation apparatus also included a conveyor device capable of conveying a textile printing target in a horizontal direction beneath the recording head. The recording head was filled with an ink (specifically, one of the inks (I-1) to (I-22)) included in an ink set to be evaluated.

[Pretreatment]

In the inkjet textile printing of each of Examples 1 to 15 and Comparative Examples 2 to 10, the above-described textile printing target was immersed in a pretreatment liquid (corresponding one of the pretreatment liquids (T-1) to (T-3)) and then dried. The obtained pretreated textile printing target was evaluated as follows.

In the inkjet textile printing of Comparative Example 1, the above-described textile printing target was used directly without undergoing the pretreatment.

[Image Density]

While the pretreated textile printing target (untreated textile printing target in Comparative Example 1) was being conveyed by the conveyor device, the ink was ejected (ejection amount: 6.3 g/m$^2$) onto an image formation area of the pretreated textile printing target using the recording head to which the ink was set. Through the above, a 3 cm×4 cm rectangular solid image was formed in the image formation area of the pretreated textile printing target. After the image formation, the textile printing target was heat-treated for 3 minutes at 160° C. The optical density (OD) of the heat-treated solid image was measured using a reflectance densitometer ("FD-9", product of KONICA MINOLTA JAPAN, INC.) under conditions of a D50 light source as an observation light source, a lighting condition of M2, a field of view of 2°, and a density status of I.

An image density reference was changed according to the color of the formed image. In detail, for cyan, magenta, and yellow images (Examples 1 to 5 and 7 to 15 and Comparative Examples 1 to 10), the image density was evaluated as "good (A)" if the OD was at least 1.2 and evaluated as "poor (B)" if the OD was less than 1.2. For black images (Example 6), the image density was evaluated as "good (A)" if the OD was at least 1.3 and evaluated as "poor (B)" if the OD was less than 1.3.

[Ejection Stability]

While the pretreated textile printing target (untreated textile printing target in Comparative Example 1) was being conveyed using the conveyor device, the ink was ejected (ejection amount: 6.3 g/m$^2$) onto the image formation area of the pretreated textile printing target using the recording head to which the ink was set. Through the above, a solid image was formed on the entire surface of the pretreated textile printing target. This operation was repeated a total of 100 times so that solid images were formed on 100 sheets of the textile printing target. Thereafter, a check pattern image for checking for occurrence of nozzle clogging was formed by ejecting the ink from all nozzles of the recording head. The number of nozzles in which nozzle clogging had occurred (faulty nozzles) was counted by observing the check pattern images. Ink ejection stability was evaluated based on the following references.

A (particularly good): 0 faulty nozzles

B (good): 1 to 5 faulty nozzles

C (poor): 6 or more faulty nozzles

[Scratch Resistance]

While the pretreated textile printing target (untreated textile printing target in Comparative Example 1) was being conveyed using the conveyor device, the ink was ejected (ejection amount: 6.3 g/m$^2$) onto the image formation area of the pretreated textile printing target using the recording head to which the ink was set. Through the above, a 3 cm×4 cm rectangular solid image was formed in the image formation area of the pretreated textile printing target. Next, the textile printing target on which the image had been formed was dried by processing for 3 minutes at a 160° C. temperature. Next, untreated cotton broadcloth (evaluation cloth) was placed over the surface of the textile printing target on which the image had been formed (surface on the side of the solid image). Next, a 1-kg weight was placed on the evaluation cloth. Then, the solid image formed on the textile printing target was rubbed back and forth 100 times with the evaluation cloth while 1 kg of weight was being applied to the evaluation cloth by the above-described weight.

Thereafter, the degree of contamination on the side of the evaluation cloth that had been in contact with the solid image was classified using a gray scale for contamination specified in Japanese Industrial Standard (JIS) L0805:2005. In the classification, the degree of contamination was classified in five levels: level 1, level 2, level 3, level 4, and level 5. This classification indicates that the degree of contamination increases with a decrease in the level of the classi fication. The scratch resistance of the images was evaluated based on the following reference.

A (good): degree of contamination at level 4 or 5
B (fair): degree of contamination at level 3
C (poor): degree of contamination at level 1 or 2 particles contained the specific binder resin. The specific binder resin had the glass transition point of at least 0° C. and no higher than 45° C. The pretreatment liquid contained water and the cationic material. The ink sets used in the inkjet textile printing of Examples 1 to 15 each had excellent

TABLE 4

| | | Example | | | | | | | | |
|---|---|---|---|---|---|---|---|---|---|---|
| | | | 1 | 2 | 3 | 4 | 5 | 6 | 7 | 8 |
| Ink | Type | | I-1 | I-2 | I-3 | I-4 | I-5 | I-6 | I-7 | I-8 |
| | Pigment dispersion | | P-1 | P-2 | P-5 | P-9 | P-10 | P-11 | P-2 | P-2 |
| | Pigment particles | Aspect ratio | 2.4 | 2.8 | 2.3 | 2.6 | 2.8 | 2.9 | 2.8 | 2.8 |
| | | Major axis [nm] | 172 | 191 | 57 | 184 | 188 | 190 | 191 | 191 |
| | Dispersant | | D-1 | D-1 | D-1 | D-1 | D-1 | D-1 | D-1 | D-1 |
| | Binder resin particles | | A | A | A | A | A | A | B | E |
| | Preparation method | | a | a | a | a | a | a | a | a |
| | Pretreatment liquid | | T-1 | T-1 | T-1 | T-1 | T-1 | T-1 | T-1 | T-1 |
| Evaluation | Image density | OD | 1.27 | 1.31 | 1.21 | 1.30 | 1.24 | 1.41 | 1.31 | 1.31 |
| | | Evaluation | A | A | A | A | A | A | A | A |
| | Ejection stability | | A | A | A | A | A | A | A | A |
| | Scratch resistance | | A | A | A | A | A | A | A | A |

TABLE 5

| | | Example | | | | | | | |
|---|---|---|---|---|---|---|---|---|---|
| | | | 9 | 10 | 11 | 12 | 13 | 14 | 15 |
| Ink | Type | | I-9 | I-10 | I-2 | I-2 | I-11 | I-12 | I-13 |
| | Pigment dispersion | | P-2 | P-2 | P-2 | P-2 | P-12 | P-13 | P-2 |
| | Pigment particles | Aspect ratio | 2.8 | 2.8 | 2.8 | 2.8 | 2.8 | 2.8 | 2.8 |
| | | Major axis [nm] | 191 | 191 | 191 | 191 | 191 | 191 | 191 |
| | Dispersant | | D-1 | D-1 | D-1 | D-1 | D-2 | D-3 | D-1 |
| | Binder resin particles | | F | G | A | A | A | A | A |
| | Preparation method | | a | a | a | a | a | a | b |
| | Pretreatment liquid | | T-1 | T-1 | T-2 | T-3 | T-1 | T-1 | T-1 |
| Evaluation | Image density | OD | 1.30 | 1.32 | 1.31 | 1.31 | 1.30 | 1.29 | 1.31 |
| | | Evaluation | A | A | A | A | A | A | A |
| | Ejection stability | | A | A | A | A | A | A | A |
| | Scratch resistance | | A | A | A | A | A | A | A |

TABLE 6

| | | Comparative Example | | | | | | | | | |
|---|---|---|---|---|---|---|---|---|---|---|---|
| | | | 1 | 2 | 3 | 4 | 5 | 6 | 7 | 8 | 9 | 10 |
| Ink | Type | | I-2 | I-14 | I-15 | I-16 | I-17 | I-18 | I-19 | I-20 | I-21 | I-22 |
| | Pigment dispersion | | P-2 | P-3 | P-4 | P-6 | P-7 | P-8 | P-14 | P-2 | P-2 | P-2 |
| | Pigment particles | Aspect ratio | 2.8 | 1.3 | 3.7 | 2.1 | 3.3 | 2.4 | 2.8 | 2.8 | 2.8 | 2.8 |
| | | Major axis [nm] | 191 | 113 | 222 | 48 | 180 | 210 | 191 | 191 | 191 | 191 |
| | Dispersant | | D-1 | D-1 | D-1 | D-1 | D-1 | D-1 | D-4 | D-1 | D-1 | D-1 |
| | Binder resin particles | | A | A | A | A | A | A | A | C | D | — |
| | Preparation method | | a | a | a | a | a | a | a | a | a | c |
| | Pretreatment Liquid | | — | T-1 | T-1 | T-1 | T-1 | T-1 | T-1 | T-1 | T-1 | T-1 |
| Evaluation | Image density | OD | 1.09 | 1.10 | 1.40 | 0.96 | 1.38 | 1.35 | 1.11 | 1.31 | 1.31 | 1.31 |
| | | Evaluation | B | B | A | B | A | A | B | A | A | A |
| | Ejection stability | | A | A | C | A | C | C | A | C | A | A |
| | Scratch resistance | | A | A | A | A | A | A | A | A | C | C |

As shown in Tables 4 to 6, the ink sets used in the inkjet textile printing of Examples 1 to 15 each included an ink and a pretreatment liquid. The ink contained pigment particles, the anionic dispersant, and binder resin particles. The pigment particles had the major axis of at least 50 nm and no greater than 200 nm. The pigment particles had the aspect ratio of at least 2.0 and no greater than 3.0. The binder resin ink ejection stability and formed the image with the desired image density and excellent scratch resistance.

By contrast, each of the ink sets and the ink used in the inkjet textile printing of Comparative Examples 1 to 10 did not meet the above features. As such, the inkjet textile printing of Comparative Examples 1 to 10 was poor in at least one of ink ejection stability, image density of the formed image, and scratch resistance of the formed image.

In detail, in the inkjet textile printing of Comparative Example 1, the image density of the formed image was poor because the pretreatment was not performed.

In the inkjet textile printing of Comparative Example 2, the aspect ratio of the pigment particles was less than 2.0. In the inkjet textile printing of Comparative Example 4, the major axis of the pigment particles was less than 50 nm. Pigment particles with an excessively small aspect ratio (nearly spherical) or pigment particles with an excessively small size were determined to easily permeate the textile printing target. In the inkjet textile printing of Comparative Examples 2 and 4, the image density was determined to be poor because the pigment particles permeated the textile printing target after textile printing.

In the inkjet textile printing of Comparative Example 3, the aspect ratio of the pigment particles was greater than 3.0 and the major axis of the pigment particles was greater than 200 nm. In the inkjet textile printing of Comparative Example 5, the aspect ratio of the pigment particles was greater than 3.0. In the inkjet textile printing of Comparative Example 6, the major axis of the pigment particles was greater than 200 nm. Inks containing pigment particles with an excessively large size or pigment particles with an excessively large aspect ratio readily increase in viscosity when the density of the pigment particles increases due to drying. In the inkjet textile printing of Comparative Examples 3, 5, and 6, the ink ejection stability was determined to be poor because the ink droplets attached to the ink nozzles increased in viscosity due to drying and caused nozzle clogging.

In the inkjet textile printing of the Comparative Example 7, the dispersant was not anionic. The non-anionic dispersant was determined not to display a result promoting attachment of the pigment particles to the textile printing target or a result preventing electrostatic repulsion between the pigment particles to cause the pigment particles to agglomerate on the textile printing target. As such, in the inkjet textile printing of Comparative Example 7, the image density was determined to be poor.

In the inkjet textile printing of Comparative Example 8, the glass transition point of the binder resin was lower than 0° C. In the inkjet textile printing of Comparative Example 8, the binder resin particles were determined to cause clogging of the ink nozzles because of softening at the normal temperature. As a result, in the inkjet textile printing of Comparative Example 8, ink ejection stability was poor.

In the inkjet textile printing of Comparative Example 9, the glass transition point of the binder resin was higher than 45° C. In the inkjet textile printing of Comparative Example 9, it was determined that an image with excellent scratch resistance was not formed because the film formability of the binder resin particles was low.

In the inkjet textile printing of Comparative Example 10, the scratch resistance was determined to be poor because the ink contained no binder resin particles.

What is claimed is:

1. An ink set used in an inkjet textile printing method comprising:
    an inkjet ink; and a pretreatment liquid, wherein
    the inkjet ink contains pigment particles, an anionic dispersant, and binder resin particles,
    the pigment particles have a major axis of at least 50 nm and no greater than 200 nm,
    the pigment particles have an aspect ratio of at least 2.4 and no greater than 3.0,
    the binder resin particles contain a specific binder resin,
    the specific binder resin has a glass transition point of at least 0° C. and no higher than 45° C.,
    the specific binder resin includes (meth)acrylic resin, styrene-(meth)acrylic resin, urethane resin, urethane-(meth)acrylic resin, or polyester resin,
    the pretreatment liquid contains water and a cationic material, and
    in the pretreatment liquid, a total content ratio of the water and the cationic material is at least 90% by mass.

2. The ink set according to claim 1, wherein,
    the cationic material includes a metal salt.

3. The ink set according to claim 2, wherein
    the metal salt includes calcium chloride.

4. The ink set according to claim 1, wherein
    the cationic material in the pretreatment liquid has a content ratio of at least 1.0% by mass and no greater than 10.0% by mass.

5. The ink set according to claim 1, wherein
    the dispersant includes an alkylol ammonium salt of a polymer with an acid group.

6. An inkjet textile printing method by which an image is formed on an image formation area of a textile printing target using the ink set according to claim 1, the inkjet textile printing method comprising:
    performing pretreatment by applying by spraying or immersing the pretreatment liquid to the image formation area; and
    ejecting the inkjet ink from a head onto the image formation area.

7. The ink set according to claim 1, wherein
    in the pretreatment liquid, the content ratio of the water and the cationic material is 100% by mass.

* * * * *